Oct. 9, 1956     C. O. DONLEY     2,765,520

BEARING AND METHOD OF MAKING THE SAME

Filed Nov. 14, 1952

Inventor
Carson O. Donley
By Willis, Helwig & Caillio
Attorneys

United States Patent Office 2,765,520
Patented Oct. 9, 1956

2,765,520

BEARING AND METHOD OF MAKING THE SAME

Carson O. Donley, Indianapolis, Ind., assignor to General Motors Corporation, Detroit, Mich., a corporation of Delaware Application November 14, 1952, Serial No. 320,486

7 Claims. (Cl. 29—196.3)

This invention has to do with bearings lined with antifriction metal and the primary object of the invention is to provide an improved bearing comprising silver wherein the silver is protected from corrosion caused by lubricating oils which contain sulphur.

Silver bearings have been employed heretofore, either with or without a thin overlay of softer metal such as lead-tin or lead-indium, etc. Silver bearings without the overlay are corroded by lubricants which contain sulphur. Where the thin overlay is employed it has been common to produce it by first electrodepositing a thin layer of lead onto the silver, then electrodepositing a thin layer of indium or tin onto the lead and then heat treating the bearing to cause the indium or tin to diffuse into the lead. The indium or tin protects the lead from corrosion but does not diffuse into the silver so that if the thin overlay is scratched, scored or worn away, the silver is subject to attack by lubricating oils which contain sulphur and the like.

I have discovered that a silver bearing may be plated with a thin coating of indium and the indium diffused into the silver by a diffusion heat-treatment and that bearings so processed are highly resistant to corrosion caused by lubricants which contain sulphur. In preferred practice the indium is applied as an electrodeposited coating having a thickness within the range of approximately .00005 to .0003". The temperature employed for the diffusion heat-treatment is within the range of approximately 300°–800° F. for a time of 30 minutes or more. When temperatures toward the high portion of the range of temperatures just referred to are employed for the diffusion treatment with coatings of indium of about .003" there is a tendency to form rough surfaces. Such surfaces are undesirable for bearing purposes. Where temperatures of not appreciably more than about 300° F. are employed extended periods of heat treatment may be employed, for example, as much as four hours or more.

The following data is illustrative of the extent to which indium is diffused into silver in accordance with the present invention. A layer of indium .00015" was electroplated onto a layer of silver of about .015" in thickness and the composite product heated at a temperature of 300° F. for four hours. A first layer .000426" in thickness was then machined from the diffused layer of silver and indium and when analyzed showed an indium content of 31.1%. This percentage of indium was, of course, the average for the entire machined layer of .000426" and was considered to be the percentage of indium at the center of the machined layer, said center being .000213" from the original surface of the diffused silver-indium sample. Other layers were then machined and analyzed in a similar manner. The test data showed an indium content of 3.32% at a distance of .000749" from the original surface of the silver-indium sample and an indium content of .01% at a distance of .00127" from the original surface.

The following table shows the results of visual examination of electroplated and diffused indium on silver:

| Indium Thickness, Inches | Surface Condition With Diffusion Treatment Of— | | | | | |
|---|---|---|---|---|---|---|
| | As Plated | 300° F., 1 Hr. | 300° F., 4 Hrs. | 400° F., 1 Hr. | 600° F., 1 Hr. | 800° F., 1 Hr. |
| .00006 | Smooth | Smooth | Smooth | Smooth | Smooth | Smooth. |
| .00014 | do | do | do | do | do | Do. |
| .00020 | do | do | do | do | do | Do. |
| .00030 | do | do | do | do | do | Rough. |

As indicated in the foregoing table all diffusion treatments resulted in smooth surfaces with the exception of the diffusion heat treatment of 800° F. for one hour when an indium electrodeposit of .00030" was applied to the silver. The rough surface produced in this instance is not desired. The diffusion treatment selected in any instance should be one which will produce a smooth surface with the indium thickness used.

The diffusion heat treatment may be carried out in air or, if desired, in a neutral or reducing atmosphere.

My improved bearing having a thin layer of indium diffused into the silver may be used with or without an overlay of softer metal. For heavily loaded bearings it is preferred to employ a thin overlay of lead-indium, lead-tin, etc. The lead may be electrodeposited onto the surface of the bearing after the indium has been diffused onto the silver, the indium or tin electrodeposited onto the lead, and the metals heated to diffuse the indium or tin into the lead. Another method of forming an overlay of lead-indium or lead-tin is to codeposit electrolytically the lead and indium or lead and tin in the desired proportions. The thickness of the overlay of soft metal (where it is employed) normally is the same as that sometimes employed heretofore with silver bearings. In general the total thickness of the overlay may be within the approximate limits of .0005 to .003".

Ordinarily the silver layer of my improved bearing is supported by a backing or bearing support of a harder or stronger metal such as steel or the like. Usually also there is provided a flash or strike electrodeposit of copper or nickel onto the steel backing onto which the silver is electrodeposited to the desired thickness. The flash or strike of copper or nickel is of assistance in forming a strong bond between the silver and the supporting backing of steel. In some cases the flash coating may be omitted and the silver electroplated directly to the steel backing. A suitable procedure for accomplishing this is described in the Martz Patent 2,431,947 dated December 2, 1947.

For a bearing using a copper strike, a copper thickness of about .000020" is preferred, with the practical range being about .0000050" to .000100" in thickness. Using a nickel strike, a nickel thickness of about .000010" is presently preferred, with the practical range being from about .000005" to .000100" in thicknes.

The thickness of the silver in my improved bearing may be the same as that of ordinary silver bearings. In general the thickness may be within the thickness range of about .005" to .100". In many cases thicknesses of .015" to .025" are employed. The silver preferably is applied by electrodeposition either to the flash coated steel back, or, if desired, directly to the steel back. Usually the electrodeposited silver is annealed after machining to the desired thickness. Where either the nickel or copper strike is applied an annealing temperature of 975° F. for an hour is normally employed. In the case of a copper strike it is preferred not to anneal the silver above about 1200° F. because of the formation of a relatively weak copper-silver eutectic alloy with a consequent weakening of the bond. In the case of a nickel strike the maximum annealing temperature is about 1400° F. Where temperatures of about 1050° F. or higher are employed for the annealing operation it is necessary to employ a neutral or reducing atmosphere. Temperatures much lower than 975° F. also may be employed. In fact temperatures down to as low as room temperature may be used, depending on the characteristics of the silver bearing material which are desired. In some instances the annealing and tin diffusing heat treatments may be combined, although this is not preferred.

Reference is herewith made to the accompanying drawings in which.

Figure 1:
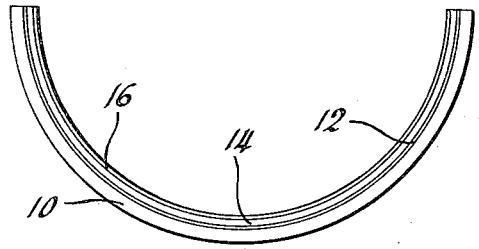
Figure 1 is an end view of one-half of an engine bearing in accordance with one embodiment of the invention.
Figure 2:
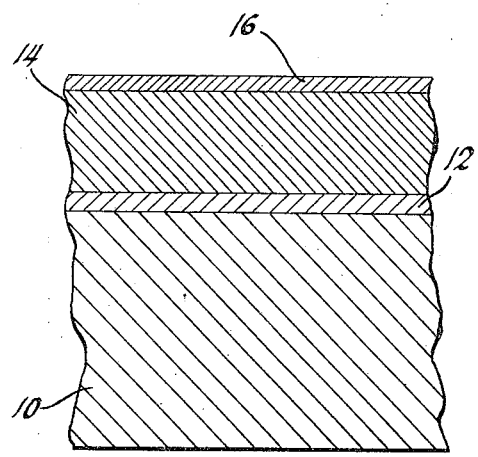
Figure 2 is a section on an enlarged scale showing the several layers of metal prior to diffusion of indium into the silver layer.
Figure 3:
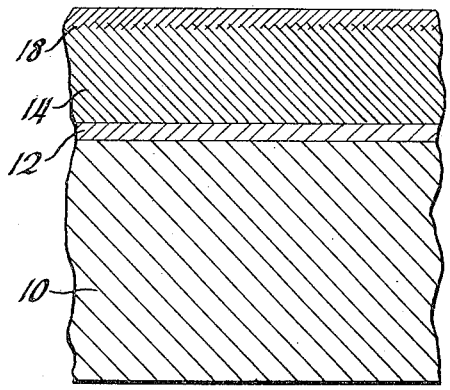
Figure 3 is a view similar to that of Figure 2 except that the indium is shown diffused into the silver layer.

Referring especially to Figures 1, 2 and 3, there is shown at 10 a backing of strong metal such as steel. To the backing is applied a thin flash or strike 12 of nickel or copper. To the strike there is applied an electrodeposited coating of silver represented at 14. A thin coating 16 of indium is electrodeposited onto the silver. Figure 3 represents the structure after a heat treatment to diffuse indium onto the silver. The diffused zone of indium-silver is represented by 18.

Figure 4:
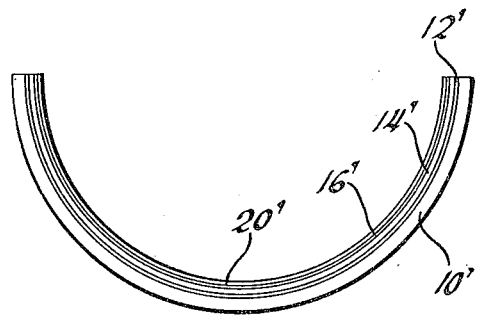
Figure 4 is a view similar to that of Figure 1 except that the bearing has a soft metal overlay.
Figure 5:
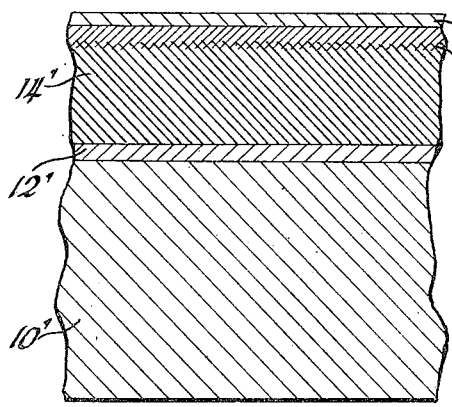
Figure 5 is a sectional view on an enlarged scale of the bearing of Figure 4 showing indium diffused into the silver and an overlay of soft metal.

The construction of the bearing of Figures 4 and 5 is generally similar to that of the modification of Figures 1, 2 and 3 except that the bearing includes an overlay of soft bearing metal. In Figures 4 and/or 5, 10' indicates a backing of strong metal such as steel, 12' represents a flash or strike of nickel or copper, 14' represents a layer of silver bonded to the copper or nickel, 16' a thin coating of indium, 18' a diffused layer of indium-silver and 20' a thin overlay of soft bearing metal such as lead-tin or lead-indium.

Various changes and modifications of the embodiments of my invention described herein may be made by those skilled in the art without departing from the spirit and scope of the invention.

I claim:

1. The method of making a bearing which comprises providing a supporting back of ferrous metal, electroplating a flash coating of a metal of the group consisting of nickel and copper onto the back, said flash coating having a thickness within the range of .000005"–.000010", electrodepositing onto said flash coating a layer of silver having a thickness within the approximate range of .005"–.100", electrodepositing indium to a thickness of .00005" to .0003" onto the silver and then heating the ferrous metal back, silver and indium to a diffusion temperature within the range of approximately 300° to 800° F. for a time of at least about thirty minutes to diffuse the indium and silver and under conditions such that the bearing surface is not roughened.

2. The method of making a bearing which comprises providing a supporting back of ferrous metal, electroplating a flash coating of a metal of the class consisting of nickel and copper onto the back, said flash coating having a thickness within the range of .000005"–.000010". electrodepositing onto said flash coating a layer of silver having a thickness within the approximate range of .005"–.100", then heating said assembly under conditions for annealing the silver, electrodepositing indium to a thickness of .00005" to .0003" onto the annealed silver and then heating the ferrous metal back, flash coating, annealed silver and indium to a temperature within the range of approximately 300° to 800° F. for a time of at least about thirty minutes to diffuse the silver and indium and under conditions such that the bearing surface is not roughened.

3. The method of making a bearing which comprises providing a supporting back of steel, bonding to said back a layer of silver having a thickness within the approximate range of .005" to .100", electroplating a layer of indium having a thickness of .00005" to .0003" onto the silver and then heating the steel back, silver and indium to a temperature within the range of approximately 300° to 800° F. for a time of at least about thirty minutes and under conditions such that the indium and silver are diffused without roughening the bearing surface.

4. The method of making a bearing which comprises providing a supporting back of steel, bonding to said back a layer of silver having a thickness within the approximate range of .005" to .100", electroplating a layer of indium having a thickness of .00005" to .0003" onto the silver, then heating the steel back, silver and indium to a temperature within the range of approximately 300° to 800° F. for a time of at least about thirty minutes and under conditions such that the indium and silver are diffused without roughening the bearing surface and thereafter applying a layer of an alloy of the group consisting of lead-tin and lead-indium alloys having a thickness of about .00005"–.0003" to the diffused silver-indium surface.

5. A bearing comprising a steel backing member, a flash of a metal of the group consisting of nickel and copper having a thickness within the range of .000005" to .000010" bonded to said steel backing member, a layer of silver having a thickness within the range of about .005" to .100" bonded to said flash coating, and an indium diffusion in the exposed surface layer, said diffusion being that resulting from applying to the silver layer a smooth layer of indium having a thickness within the range of .00005" to .0003" and heat treating the silver and indium at a temperature within the range of about 300° F. to 800° F. for a time of at least about thirty minutes and under conditions such that the surface is not roughened, said diffusion zone consisting of silver and indium.

6. A bearing as in claim 5 in which a layer of a lead-base bearing alloy having a thickness of about .00005" to .0003" is bonded to the diffusion layer.

7. A bearing comprising a steel backing member, a flash of a metal of the group consisting of nickel and copper bonded to said steel, a layer of silver having a thickness within the range of about .005" to .100" bonded to said flash coating, and an indium diffusion on the exposed surface of said silver layer, said diffusion being that resulting from applying a coating of indium .00005"

to .0003" in thickness to said silver and heat treating the silver and indium at a temperature within the range of 300° to 800° F. under conditions such that the bearing surface is not roughened, said diffusion zone consisting of silver and indium.

References Cited in the file of this patent

UNITED STATES PATENTS

| | | |
|---|---|---|
| 2,086,841 | Bagley et al. | July 13, 1937 |
| 2,266,320 | Hobbs | Dec. 16, 1941 |
| 2,283,218 | McCullough | May 19, 1942 |
| 2,386,951 | Howe | Oct. 16, 1945 |
| 2,409,983 | Martz | Oct. 22, 1946 |
| 2,417,967 | Booe | Mar. 25, 1947 |
| 2,458,839 | Dyer | Jan. 11, 1949 |
| 2,465,329 | Murray | Mar. 22, 1949 |
| 2,520,310 | Frazier et al. | Aug. 29, 1950 |
| 2,547,465 | Heintz et al. | Aug. 3, 1951 |
| 2,551,413 | Booe | May 1, 1951 |
| 2,621,988 | Donley | Dec. 16, 1952 |

FOREIGN PATENTS

| | | |
|---|---|---|
| 359,014 | Great Britain | Oct. 12, 1931 |
| 553,363 | Great Britain | May 18, 1943 |

OTHER REFERENCES

The Metal Industry, Dec. 18, 1942, pages 389–392.